United States Patent [19]

Amano et al.

[11] Patent Number: 4,732,729
[45] Date of Patent: Mar. 22, 1988

[54] FAST BREEDER REACTOR

[75] Inventors: Ken Amano, Hitachi; Kotaro Inoue, Ibaraki, both of Japan

[73] Assignee: Hitachi, Ltd., Tokyo, Japan

[21] Appl. No.: 703,904

[22] Filed: Feb. 21, 1985

[30] Foreign Application Priority Data

Feb. 24, 1984 [JP] Japan .................................. 59-32425

[51] Int. Cl.4 ............................................. G21C 15/00
[52] U.S. Cl. .................................... 376/176; 376/352; 376/365
[58] Field of Search ............... 376/175, 176, 178, 352, 376/365

[56] References Cited

U.S. PATENT DOCUMENTS

| 3,235,465 | 2/1966 | McDaniel et al. | 376/352 |
| 3,318,777 | 5/1967 | Kervenoael et al. | 376/352 |
| 3,619,367 | 11/1971 | Gumuchian | 376/365 |
| 3,736,226 | 5/1973 | Sakurama | 376/352 |
| 3,892,625 | 7/1975 | Patterson | 376/352 |
| 3,977,439 | 8/1976 | Lambert | 376/352 |
| 4,352,778 | 10/1982 | Arnaud et al. | 376/352 |

FOREIGN PATENT DOCUMENTS

| 1099797 | 9/1976 | Japan | 376/352 |
| 0054687 | 5/1978 | Japan | 376/352 |

Primary Examiner—Harvey E. Behrend
Attorney, Agent, or Firm—Antonelli, Terry & Wands

[57] ABSTRACT

In the fast breeder reactor according to this invention, a medium-pressure plenum and a high-pressure plenum are disposed, in the mentioned order from above in a reactor core. Sodium is filled in the medium- and high-pressure plenums. The pressure in the medium-pressure plenum is lower than that in the high-pressure plenum. The lower ends of the entrance nozzles of a multiplicity of fuel assemblies loaded in the reactor core are supported by a supporting plate which forms a boundary between the medium- and high-pressure plenums. The entrance nozzles of control rod guide pipes disposed among the multiplicity of fuel assemblies are also supported by said supporting plate. The sodium in the medium-pressure plenum is supplied into each control rod guide pipe through a first opening provided in the lateral surface of the entrance nozzle of each control rod guide pipe. The sodium in the high-pressure plenum is supplied into each fuel assembly from the lower end of the entrance nozzle of each fuel assembly through a second opening provided piercing through the supporting plate. The sodium in the high-pressure plenum is supplied to the medium-pressure plenum through a pressure-reducing orifice.

13 Claims, 8 Drawing Figures

FIG. 5
FIG. 6
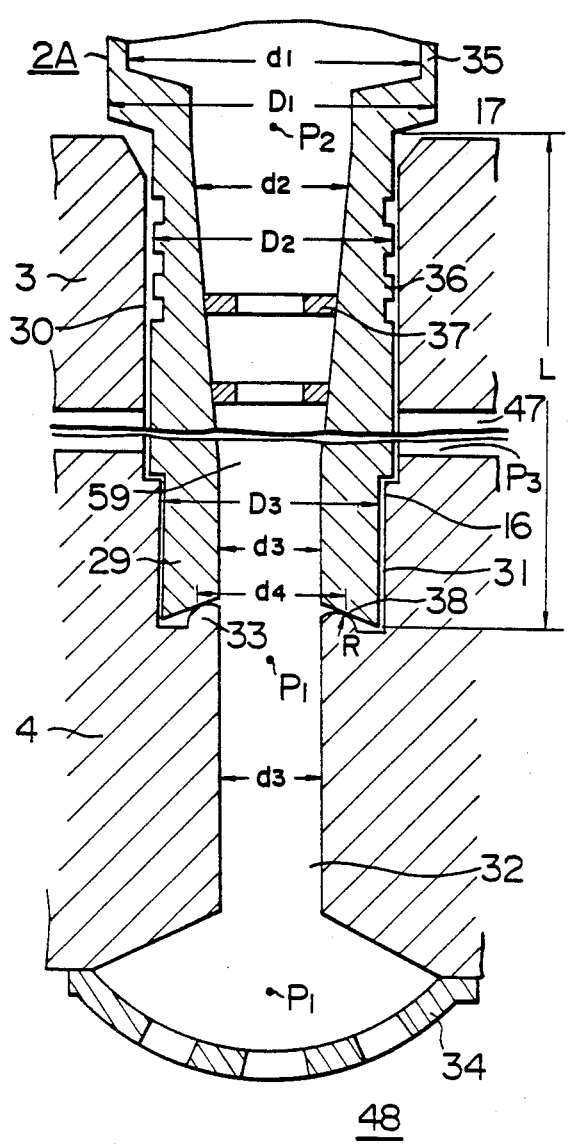
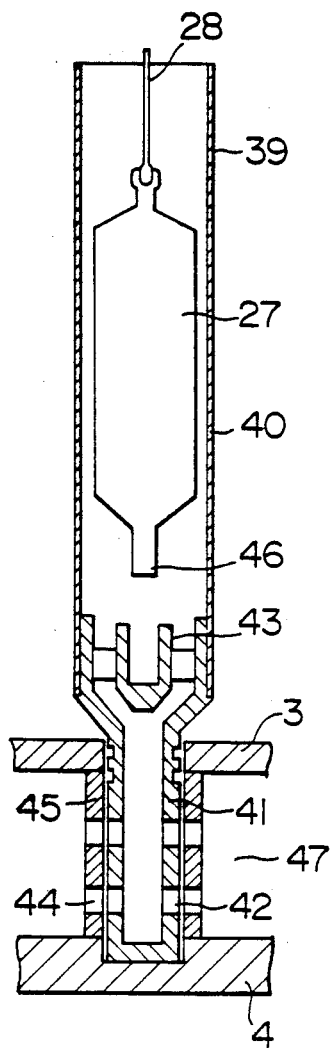

FAST BREEDER REACTOR

BACKGROUND OF THE INVENTION

The present invention relates to a fast breeder reactor, and more particularly to a fast breeder reactor which is suitable for incorporating therein a compact core structure.

A fast breeder reactor employs sodium, which is a liquid metal, as coolant and plutonium as fuel. The core of a fast breeder reactor is loaded with core fuel assemblies and blanket fuel assemblies. Each control rod is connected to a control rod driving mechanism, and vertically moves in a control rod guide pipe which is installed among fuel assemblies loaded in the reactor core. The output of the fast breeder reactor is controlled by control rods moved into and out of the reactor core. The core fuel assemblies, blanket fuel assemblies, and control rod guide pipes are supported by means of a core-supporting plate. Below the core-supporting plate, there is a high-pressure plenum into which high-pressure sodium delivered from a main circulating pump flows. The sodium in the high-pressure plenum flows into each fuel assembly through transverse holes of the entrance nozzle provided at the lower portion of each fuel assembly. The supply of sodium into control rod guide pipes can also be effected in a manner similar to that for fuel asemblies.

SUMMARY OF THE INVENTION

An object of the present invention is to provide a fast breeder reactor which is capable of reducing the height of a reactor vessel and in which the efficiency of insertion of control rods is improved.

The feature of the present invention is the provision of a medium-pressure plenum between a reactor core and high-pressure plenum disposed below the reactor core, and a channel for introducing coolant from the medium-pressure plenum into control rod guide pipes arranged in the core.

BRIEF DESCRIPTION OF THE DRAWINGS

FIG. 5 is a structual view illustrating the condition of supporting of the core fuel assembly shown in FIG. 3;

FIG. 6 is a structural view illustrating the condition of supporting of a control rod guide pipe in the embodiment shown in FIG. 3;

DESCRIPTION OF THE PREFERRED EMBODIMENTS

The present invention was made resulting from the study of the structure of a conventional fast breeder reactor.

Figure 1:
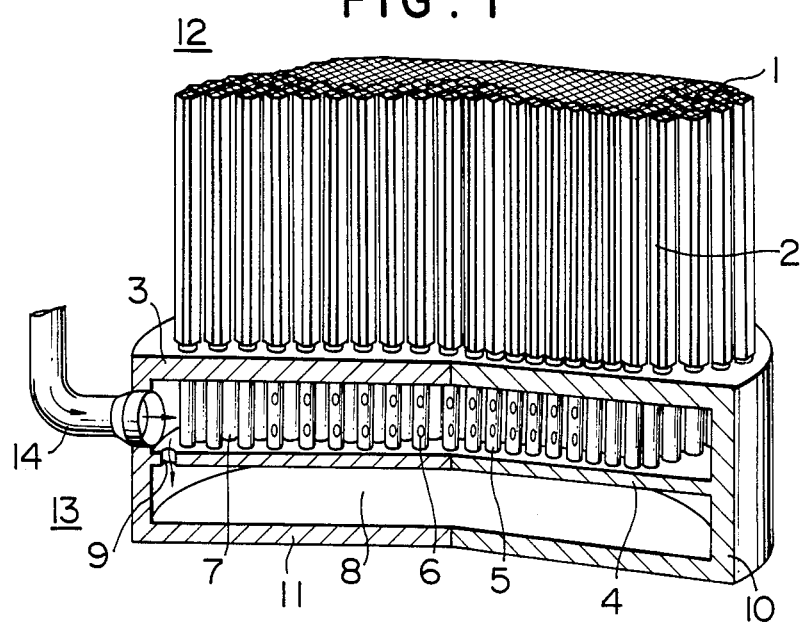
FIG. 1 is a perspective view of the core of a conventional fast breeder reactor.

FIG. 1 shows the reactor core of a conventional fast breeder reactor. Below the core is formed a high-pressure plenum 7 defined by a cylinder 10, an upper supporting plate 3 and a lower supporting plate 4. Below the lower supporting plate 4, there is a medium-pressure plenum 8 formed by a plate 11 carried by the cylinder 10. Each sleeve 5 having openings 6 is installed between the upper supporting plate 3 and the lower supporting plate 4. The entrance nozzle 15 of a fuel assembly 2 and the lower end portion of a control rod guide pipe are inserted into the sleeves 5 (Refer to FIG. 2). The cylinder 10 is supported in a reactor vessel by means of a core-supporting structure (not shown). The core-supporting structure separates the inside space of the reactor vessel into an upper plenum 12 and a lower plenum 13. Sodium in the lower plenum 13 is sucked by a main circulating pump, which is not shown and which boosts up the pressure, of the sodium and is delived into the high-pressure plenum 7 through a delivery nozzle 14. The sodium from the high-pressure plenum 7 is introduced into each fuel assembly 2 and each control rod guide pipe via openings 6. The sodium is introduced into each fuel assembly 2 through orifices 16 in an entrance nozzle 15. It is noted that the pressure of the medium-pressure plenum 8 is set lower than that of the high-pressure plenum 7 but slightly higher than that of the upper plenum 12 (low-pressure plenum).

The medium-pressure plenum 8 is provided to check the floating of the fuel assemblies 2. In other words, in FIG. 2, since the pressure loss of the bundle portion of the fuel assembly 2, $\Delta P = P_A - P_B$, is in a range of 3-5 kg/cm2, the fuel assembly is subjected to an upward thrust force. Assuming that the area within the wrapper tube of the fuel assembly 2 is Aai, the magnitude of this thrust force is given by the formula, $A_{ai} \cdot (P_A - P_B)$. To counteract this thrust force, a downward thrust force is applied preferably to the fuel assemblies. This can be obtained by the medium-pressure plenum 8 which gives a downward thrust force of $A_N \cdot (P_A - P_L)$ where $A_N$ is the pressure-receiving area of the entrance nozzle 15. Thus it becomes possible to reduce the floating force of the fuel assemblies 2.

Figure 2:
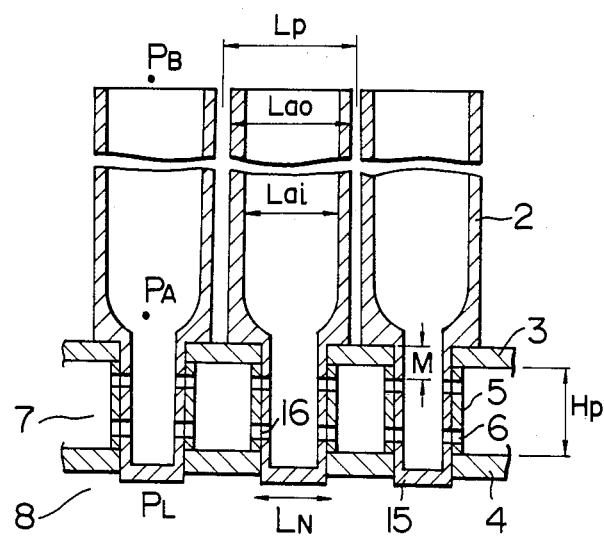
FIG. 2 is a detailed vertical sectional view of the fuel-assembly supporting portion shown in FIG. 1.

In a case where a coolant influx system as is shown in FIG. 2 is adopted, the coolant in the high-pressure plenum 7 flows in such a manner that it crosses the group of entrance nozzles of several hundred fuel assemblies 2 densely arranged. Hence, a large radial pressure loss results within the high-pressure plenum 7. For this reason, it is liable to be impossible to maintain a sufficient influx pressure. In order to eliminate this problem, conventionally the length of the entrance nozzles 15 is usually made longer, and as well the height ($H_P$) of the high-pressure plenum is made higher to make the flow rate of the coolant low, thereby decreasing the pressure loss of the flow.

Next, it is conceivable that a bending moment may act on an upper spherical seat for each fuel assembly 2, which is located on the upper fitting portion of the entrance nozzle 15, owing to the horizontal vibration of the fuel assembly 2 as a result of an earthquake or the like. Therefore, the entrance nozzle 15 is required to withstand this bending stress. However, at the portion of the entrance nozzle 15 where the orifice 16 is formed, the rigidity of the pipe is comparatively low. For this reason, the length M (refer to FIG. 2) of the upper fitting portion of the entrance nozzle 15 is extended, thereby lowering the entrance nozzle 15 to make smaller the bending moment applied to the entrance nozzle 15. This problem could be solved by thickening the wall thickness of the entrance nozzle 15. Yet, making smaller the inside diameter of the entrance nozzle would cause the flow rate of the coolant to increase. On the other hand, making larger the outside diameter of the entrance nozzle 15 would cause the intervals of the sleeves 5 to become too small. Hence, it would be impossible to obtain the desired pressure-reducing characteristics of the orifice.

Because of the pressure loss of the coolant and the restriction in aseismatic strength, as explained above, the length of the entrance nozzle 15 becomes extremely long.

In addition, in a fast breeder reactor like the one explained above, the amount of heat generated in the control rod is small, so that, in terms of the flow rate of the coolant (sodium), only about 10% of that for the fuel assembly may be used. However, since there is a very small amount of heat generation due to (n, α) reaction, it is not feasible to completely dispense with cooling. The channel resistance in the control rod is relatively small as compared with that for the fuel assembly. In particular, a cylinderical annular gap between the control rod guide pipe and the control rod is made substantially large (approximately 1 cm) in order to enhance the reliability of the insertion of the control rod at the time of an earthquake. Consequently, a large quantity of sodium can flow under a very small pressure differential. Accordingly, in the case of supplying the sodium in the high-pressure plenum 7 into the control rod guide pipe, each sleeve 5 into which the control rod guide pipe is inserted, and the sodium influx holes in the lower portion of the control rod guide pipe must be made relatively small, and, at the same time, a multistage orifice structure must be adopted in which the diameter of the posterior stage of the influx hole is made smaller than that of the preceding stage thereof. In such a case, however, the internal pressure loss between the high-pressure plenum 7 and the control rod guide pipe increases, which impedes the insertion of the control rods at the time when the control rods are rapidly inserted into the reactor core during a scram. At the time of rapidly inserting the control rods, it is necessary to discharge the sodium located below the control rod within the control rod guide pipe outside of the guide pipe. If the aforementioned orifice is small, however, discharge to the high-pressure plenum is restricted. Consequently, this results in an increase in the quantity of the sodium which passes through the gap between the control rod and the control rod guide pipe and through the inside of the control, and is discharged upward, causing the lowering of the control rod to be retarded.

As a result of conducting examinations to solve these problems, the inventors found out that these problems can be solved by disposing the medium-pressure plenum in the top portion and the high-pressure plenum in the lower portion and by supplying into the fuel assemblies the coolant from the high-pressure plenum through the lower side, and as well supplying into the control rod guide pipe the coolant from the medium-pressure plenum in the radial direction. An embodiment of the present invention will be described hereafter.

Figure 3:
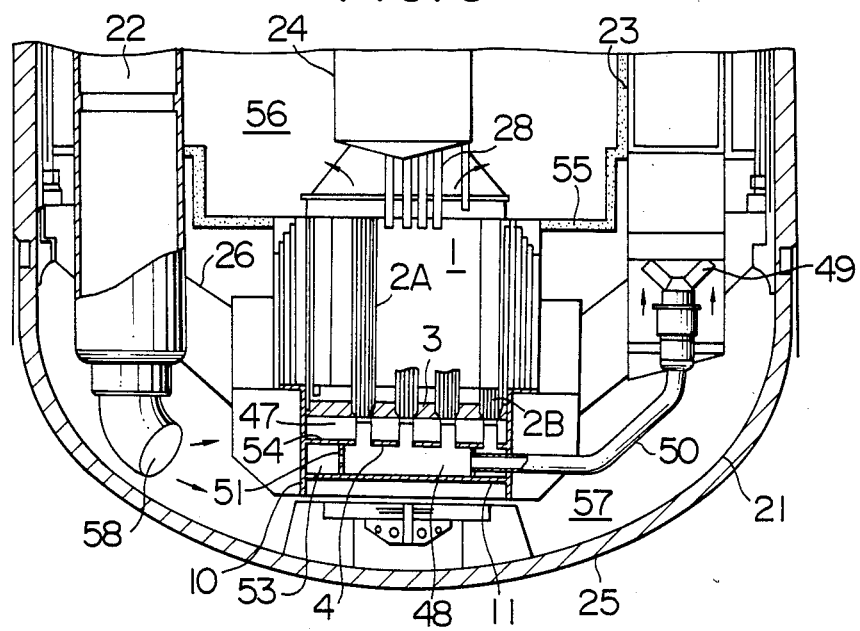
FIG. 3 is a vertical sectional view of a tank-type fast breeder reactor in a preferred emboding form of the present invention.
Figure 4:
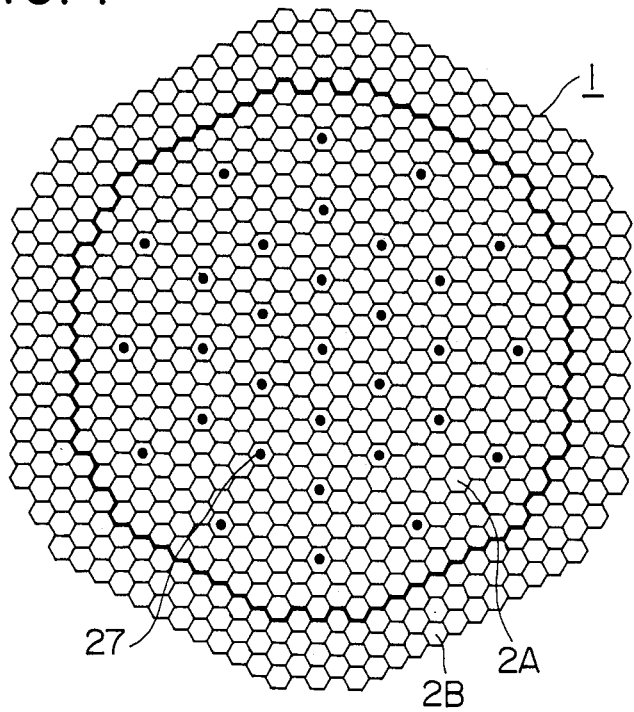
FIG. 4 is a transverse sectional view of the reactor core shown in FIG. 3.

A preferred embodiment of the present invention applied to a tank-type fast breeder reactor is shown in FIGS. 3 and 4. The tank-type fast breeder reactor has a reactor vessel 21 installed to a roof slab (not shown) supported by the building. An intermediate heat exchanger 22, a main circulating pump 23, and the upper structure 24 of the core are installed on the roof slab, within the reactor vessel 21. A guard vessel 25 surrounds the reactor vessel 21. A cylinder 10 is installed in the reactor vessel 21 by means of a core-supporting structure 26. An upper supporting plate 3, a lower supporting plate 4 and a plate 11 are installed in the cylinder 10 downward in the mentioned order. FIG. 4 shows a transverse sectional view of a reactor core 1. The reactor core 1 comprises a core region where core fuel assemblies 2a are disposed in its center, and a blanket region where blanket fuel assemblies 2B are disposed, in the peripheral portion surrounding the core fuel assemblies 2A. Each core fuel assembly 2A has a multiplicity of fuel pins which contain plutonium, i.e., a fissionable material. The fuel pins in the blanket fuel assemblies 2B mainly contain natural uranium or depleted uranium. The control rod 27 move vertically in the core region among the fuel assemblies. The control rods 27 are coupled with a control rod drive unit 28 installed on the upper structure of the core and are moved vertically by the same.

The core fuel assemblies 2A and the blanket fuel assemblies 2B are supported by the lower supporting plate 4. Detailed description will be made to the supporting of each core fuel assembly 2A with reference to FIG. 5. The supporting of each blanket fuel assembly 2B is also effected in a similar manner. FIG. 5 shows the lower end portion of the core fuel assembly 2A. An opening 30 into which the entrance nozzle (diameter: $D_2$) of the core fuel assembly 2A is inserted is provided in the upper supporting plate 3. In the lower supporting plate 4, a stepped opening 31 for preventing misloading of the core fuel assembly 2A is provided, and a through hole 32 with a diameter $d_3$ through which the sodium flows is also provided. An annular bead 33 with a radius R is provided at the bottom of the opening 31. A foreign object removing plate 34 having small holes is disposed at the entrance side of the through hole 32, and is attached to on the lower supporting plate 4. The entrance nozzle 29, whose diameter is small at its lower end ($D_2 > D_3$), is incorporated to the lower end portion of the wrapper tube 35 of the core fuel assembly 2A. The fuel pin containing plutonium is housed in the hexagonally-shaped wrapper tube 35. A labyrinth 36 is formed on the outside of the upper end portion of the entrance nozzle 29. A channel 59 is formed in the entrance nozzle 29. This channel 59 is a hole which has a diameter $d_3$ at its lower end portion, increasing its diameter in the upward direction from the lower end portion. A plurality of orifices 37 are disposed radially in the entrance nozzle 29. The lower end surface of the entrance nozzle 29 is recessed and is inclined inward and upward. The lower end surface of such an entrance nozzle 29 is in tangential contact with the annular bead 33. The core fuel assembly 2A is supported on a line 38 by the lower supporting plate 4.

Next, description will be made of how the control rod guide pipe is supported. FIG. 6 shows the control rod guide pipe 39. The control rod guide pipe 39 comprises a hexagonally-shaped cylindrical body 40, and the entrance nozzle 41 which is installed at the lower end portion thereof. Openings 42 are formed in the entrance nozzle 41. A dashpot 43 is placed in the control rod guide pipe 39. The upper and lower ends of the sleeve 45 having openings 44 are installed on the upper supporting plate 3 and the lower supporting plate 4, respectively. The control rod guide pipes 40 are arranged corresponding to the positions of the control rods 27, as shown in FIG. 4. Each control rod 27 coupled with the control rod drive unit 28 is disposed in the control rod guide pipe 39. A dash ram 46 which is located at the lower end of the control rod 27 is inserted into the dashpot 43 when the control rod 27 has been completely inserted into the reactor core. The dashpot 43 and the dash ram 46 serve as a damper at the time of rapid insertion of the control rod 27.

Figure 7:
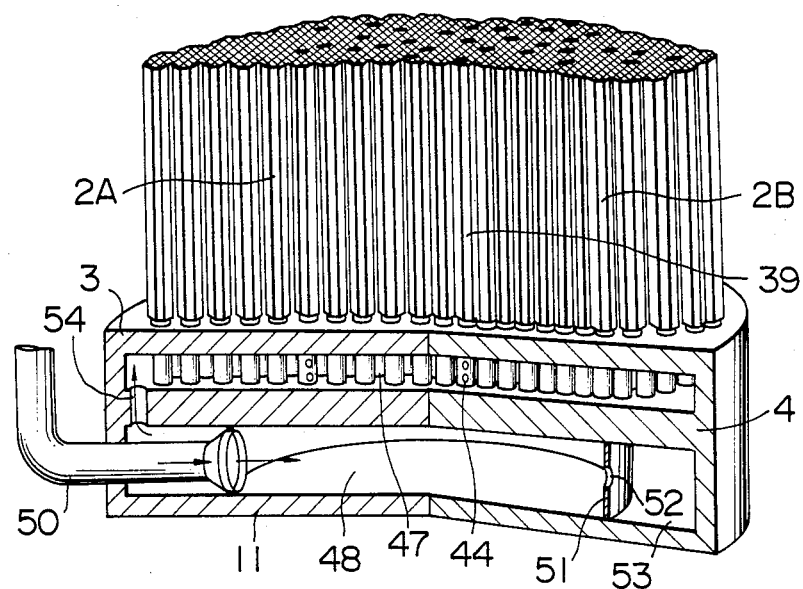
FIG. 7 is a perspective view of a reactor core portion of the embodiment shown in FIG. 3.

In FIG. 3, a medium-pressure plenum 47 is defined between the upper supporting plate 3 and the lower supporting plate 4, while a high-pressure plenum 48 is defined between the lower supporting plate 4 and the plate 11. A coolant-introducing pipe 50 which is coupled to the delivery side of the impeller 49 of the main circulating pump 23 is communicated with the high-pressure plenum 48. A cylindrical partition 51 is laid around the outer periphery of the high-pressure plenum 48. An annular medium-pressure plenum 53 is defined between this cylindrical partition 51 and the cylinder 10. The high-pressure plenum 48 and the annular plenum 53 are communicated together by means of an orifice 52 provided in the cylindrical partition 51, as shown in FIG. 7. Furthermore, the annular plenum 53 and the medium-pressure plenum 47 are communicated by means of openings provided in the lower supporting plate 4. It can be said that the cylindrical partition 51 having the orifice 52 serves as a pressure reducing means for communicating between the medium-pressure plenum 47 and the high-pressure plenum 48.

A partitioning wall 55 is provided in the reactor vessel 21. The partitioning wall 55 is installed on the periphery of the reactor core 1 and separates the inside space of the reactor vessel into the upper plenum 56 and the lower plenum 57.

The low-temperature sodium in the lower plenum 57 in sucked by the main circulating pump 23, which increases the pressure of sodium, and is supplied to the inside of the high-pressure plenum 48 through the sodium-introducing pipe 50. The sodium in the high-pressure plenum 48 is supplied to the inside of each core fuel assembly 2A through the through hole 32 in the lower supporting plate 4. The sodium pressure $P_1$ (refer to FIG. 5) is decreased to a predetermined pressure $P_2$ (refer to FIG. 5) through the orifice 37. This sodium flows into the wrapper tube 35, is heated by heat generated by the fission of plutonium in the fuel pins, and is discharged from each core fuel assembly 2A to the upper plenum 56 in a high-temperature state. The high-temperature sodium discharged into the upper plenum 56 is introduced into the intermediate heat exchanger 22, where it is subjected to heat exchange with secondary sodium which therefore drops the temperature of the sodium from the upper plenum. The sodium whose temperature has dropped in the intermediate heat exchanger 22 is delivered again to the lower plenum 57 through the lower nozzles 58. In this embodiment, since the entrance nozzles of the fuel assemblies do not extend through the high-pressure plenum 48, unlike the case of the conventional example, the radial pressure loss of the high-pressure plenum 48 is extremely small. For this reason, the pressures at the entrance of the core fuel assemblies 2A are made virtually equal, together and the distribution of the flow rate in each core fuel assembly 2A is made uniform. Additionally, it is possible to reduce the height of the high-pressure plenum 48. Furthermore, the capacity of the main circulating pump 23 can be reduced as the radial pressure loss of the high-pressure plenum 48 can be reduced. The orifice 37 serves to adjust the distribution of the flow rate in each core fuel assembly 2A. According to this embodiment, the seismic resistance improves since transverse holes such as the conventionally employed ones are not present in the entrance nozzle 29.

Next, description will be made of the effect of preventing the floating of the core fuel assemblies in the present embodiment. According to this embodiment, as shown in FIG. 5, the high-pressure receiving area of the entrance of each core fuel assembly 2A is made small (to reduce the floating force), and the area of the portion to which is applied a downward force due to the pressure differential between the internal pressure $P_2$ of the core fuel assembly 2A and the pressure $P_3$ of the medium-pressure plenum 47 is made large. In other words, the weight of the core fuel assembly 2A is supported on the annular line 38 (a circle with a diameter $d_4$) of the annular bead 33. The portion of contact (concentric with the through hole 32) between the lower end of the entrance nozzle 29 of the core fuel assembly 2A and the annular bead 33 serves as a sealing portion. The outside area of the contacting portion $S_1$ $[=\pi(D_3^2-d_4^2)/4]$ is greater than the inside area of the contacting portion $S_2$ $[=\pi(D_4^2-d_3^2)/4]$. The area $S_2$ is the aforementioned high-pressure receiving area, while the area $S_1$ is the area to which the aforementioned pressure differential $(P_2-P_3)$ is applied. For this reason, the downward force becomes large, and therefore it is possible to completely prevent the floating of the core fuel assemblies 2A since this force acts together with the weight of each core fuel assembly 2A itself. The height L of the entrance nozzle 29 according to this embodiment is approximately one-third of the height of the conventional entrance nozzle 15.

A part of the sodium in the high-pressure plenum 48 reaches the inside of the annular plenum 53 after its pressure is appreciably reduced (by about one-tenth) through the orifice 52. The pressure in the annular plenum 53 is only slightly higher than that of the upper plenum 56. The sodium in the annular plenum 53 is introduced via its entrance nozzle into the blanket fuel assembly 2B supported by the lower supporting plate 4, similarly as shown in FIG. 5, and, at the same time, is introduced into the medium-pressure plenum 47 via the opening 54. The amount of heat generated in the blanket fuel assembly 2B is appreciably small in comparison with that of the core fuel assembly 2A; therefore, it is necessary to supply the sodium into the blanket fuel assembly 2B after reducing its pressure, as described above, in view of the distribution of the flow rate. The sodium which has come up in each blanket fuel assembly 2B is delivered to the upper plenum 56. The pressure in the medium-pressure plenum 47 is virtually equal to the pressure in the annular plenum 53. For this reason, the annular plenum 53 may be said to be a medium-pressure plenum. The sodium which has flown into the medium-pressure plenum 47 passes the openings 44 of the sleeve 45 and the opening 42 of the entrance nozzle 41 and then flows into the control rod guide pipe 39. This sodium comes up while cooling the control rod 27 and is delivered into the upper plenum 56. Since a multiplicity of entrance nozzles are present in the medium-pressure plenum 47, the radial pressure loss of the medium-pressure plenum 47 is large. For this reason, it is not necessary to provide an orifice for reducing the pressure in the entrance nozzle 41 of the control rod guide pipe, and as well the entrance nozzle 41 can be made short.

As explained above, the supply of the sodium for cooling the control rod 27 from the medium-pressure plenum 47 is also advantageous in terms of the efficiency of inserting the control rods 27. In other words, it is necessary to rapidly insert the control rods 27 into the reactor core 1 at the time of a scram. When each control rod 27 is inserted, the sodium inside the control rod guide pipe 39 is discharged out by the volume of the inserted portion of the control rod 27. This sodium is discharged into the upper plenum 56 or into the medium-pressure plenum 47 in a counterflow manner. The channel resistance brought about by this discharged sodium constitutes a resisting force at the time of insertion of the control rod, and moderates the acceleration of the insertion of the control rod 27. If the sodium for cooling each control rod 27 is supplied from the high-pressure plenum, the counter flow of the sodium at the time of inserting the control rod occurs only with difficulty and since the sodium is discharged only into the upper plenum 56, there is a danger of the resistance becoming greater at the time of insertion. Meanwhile, if the sodium for cooling the control rod 27 is supplied from the medium-pressure plenum 47, it becomes readily possible for the sodium in the control rod guide pipe 39 to easily flow backward into the medium-pressure plenum 47 at the time of inserting the control rod. Hence, the resistance at the time of inserting the control rod can be made small. For this reason, according to the present embodiment, the efficiency of rapidly inserting the control rods 27 at the time of a scram can be improved, thereby making it possible to stop the fast breeder reactor in an extremely short period of time.

According to this embodiment, since the heights of the entrance nozzles including the core fuel assembly, the blanket fuel assembly, and the control rod guide pipe can be greatly reduced, the height from the upper end of the reactor core 1 to the level of the sodium in the upper plenum 56 can be shortened by a greater degree than was possible in the past and the height is set to a predetermined value so that the upper ends of these fuel assemblies will not protrude from the sodium at the time when the fuel assemblies are taken out of the reactor core 1 and are moved horizontally inside the upper plenum 56. If the upper end of the fuel assemblies protrude from the level of the sodium, the cooling of the fuel assemblies is hampered at the time when they are moved horizontally. Accordingly, the lower the entrance nozzle 29, the height of the fuel assembly can be made smaller by the same margin, and the height from the upper end of the reactor core to the level of the sodium in the upper plenum can be reduced, and if the height becomes low, it becomes possible to lower the height of the reactor vessel 21 by the same margin. The height of the reactor vessel 21 can be further lowered by an amount equivalent to the amount by which the height of the high-pressure plenum 48 becomes lower, as described above. Thus, according to the present embodiment, it is possible to make the reactor vessel 21 compact and reduce the quantity of sodium contained therein.

Figure 8:
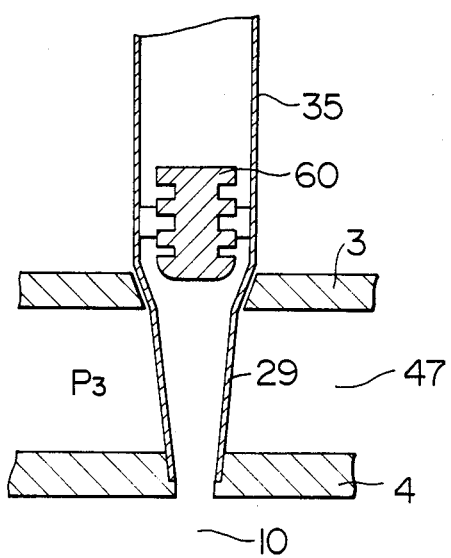
FIG. 8 is a vertical section of another embodiment of a core fuel assembly to which the present invention is applied.

Another embodiment of the core fuel assembly is shown in FIG. 8. The figure shows a lower end portion of the core fuel assembly. According to this embodiment, in place of the orifice 37 of the core fuel assembly shown in FIG. 5, a neutron shielding body 60 which forms a labyrinth-like resisting body on its side is disposed at the lower end portion of the wrapper tube 35.

This invention is also applicable to a loop-type fast breeder reactor.

According to the present invention, it is possible to lower the height of a reactor vessel, and the efficiency of inserting control rods at the time of an emergency can be improved.

What is claimed is:

1. A fast breeder reactor comprising: a reactor vessel, a reactor core constituted by a plurality of fuel assemblies and a plurality of control rod guide pipes disposed in said reactor vessel, a partitioning member disposed between said reactor vessel and said reactor core and serving to separate the inside space of said reactor vessel into an upper plenum and a lower plenum, a high-pressure plenum, a medium-pressure plenum whose pressure is lower than that of said high-pressure plenum but is higher than said upper plenum; and a means of introducing a coolant into said high-pressure plenum, wherein said high-pressure plenum is disposed below said reactor core, said medium-pressure plenum being disposed between said reactor core and said high-pressure plenum, and wherein there is provided a channel for introducing said coolant from said medium-pressure plenum into said control rod guide pipe, a partition plate separating said high-pressure plenum and said medium-pressure plenum, said partition plate supporting lower ends of said fuel assemblies and said control rod guide pipes and support members thereof, the lower ends of said fuel assemblies and said control rod guide pipes and said support members thereof extending across said medium-pressure plenum in a direction toward said high-pressure plenum without extending across said high-pressure plenum and ending in said partition plate, and means for introducing coolant from said high-pressure plenum to the lower ends of said fuel assemblies.

2. A fast breeder reactor comprising: a reactor vessel, a reactor core constituted by a plurality of fuel assemblies and a plurality of control rod guide pipes disposed in said reactor vessel, a partitioning member disposed between said reactor vessel and said reactor core and serving to separate the inside space of said reactor vessel into an upper plenum and a lower plenum, a high-pressure plenum, a medium-pressure plenum whose pressure is lower than that of said high-pressure plenum but is higher than said upper plenum, and a means of introducing a coolant into said high-pressure plenum, wherein said high-pressure plenum is disposed below said reactor core, said medium-pressure plenum being disposed between said reactor core and said high-pressure plenum, and wherein there is provided a first channel for introducing said coolant from said medium-pressure plenum into said control rod guide pipe and a second channel for introducing said coolant from said high-pressure plenum into the lower end portion of said fuel assemblies, a partition plate separating said high-pressure plenum and said medium-pressure plenum, said partition plate supporting lower ends of said fuel assemblies and said control rod guide pipes and support members thereof, the lower ends of said fuel assemblies and said control rod guide pipes and said support members thereof extending across said medium-pressure plenum in a direction toward said high-pressure plenum without extending across said high-pressure plenum and ending in said patition plate, and means for introducing coolant from said high-pressure plenum to the lower ends of said fuel assemblies.

3. In a fast breeder reactor comprising: a reactor vessel, a reactor core having a center zone and a peripheral zone surrounding said center zone and constituted by a plurality of core fuel assemblies arranged in said center zone, a plurality of blanket fuel assemblies arranged in said peripheral zone and control rod guide pipes in which control rods are guided therealong, said core blanket fuel assemblies each having an entrance nozzle in a lower end portion opened at lower end face thereof, and said control rod guides each having an entrance nozzle formed with at least one opening formed in a peripheral wall of a lower end portions thereof, a partitioning member disposed between said reactor vessel and said reactor core and delimiting the inside space of said reactor vessel into an upper plenum and a lower plenum; a high-pressure plenum laid below said reactor core; medium-pressure plenum whose pressure is lower than that of said high-pressure plenum but is higher than said upper plenum; and a means for introducing coolant into said high-pressure plenum, the improvement wherein said medium-pressure plenum is disposed between said reactor core and said high pressure-plenum, and said high and medium-pressure plenums are separated by a partition plate serving as a lower supporting plate for said core and blanket asssemblies and said control rod guide pipes, said partition plate being formed therein with through-holes receiving said entrance nozzles of said core and blanket fuel assemblies which extend across said medium-pressure plenum, said partition plate also being formed therein with recesses which receive said entrance nozzles of said control rod guide pipes which extend across the medium-pressure plenum, a partition wall having at least one orifice formed therein being disposed in said high-pressure plenum to define an annular plenum surrounding said high-pressure plenum, said annular plenum being communicated with said medium-pressure plenum through at least one opening formed in said partition plate while communicating with said high-pressure plenum through said orifice formed in said partition wall, whereby said core fuel asemblies are fed with coolant from said high-pressure plenum through said through-holes formed in said partition plate while said blanket fuel assemblies are fed with coolant from said annular plenum through said through-holes formed said partition plate, and said control rod guide pipes are fed with coolant from said medium-pressure plenum through the openings formed in the peripheral wall of said entrance nozzles of said control rod guide pipes.

4. In a fast breeder reactor comprising: a reactor vessel, a reactor core constituted by a plurality of fuel assemblies and control rod guide pipes in which control rods are guided therealong, said fuel assemblies each having an entrance nozzle in a lower end portion opened at a lower end face thereof, said entrance nozzle defining therein a flow passage, and control rod guide pipes each having an entrance nozzle formed with at least one opening formed in a peripheral wall of lower end portions thereof, a partitioning member disposed between said reactor vessel and said reactor core and delimiting the inside space of said reactor vessel into an upper plenum and lower plenum; a high-pressure plenum disposed below said reactor core; a medium-pressure plenum whose pressure is lower than that of said high-pressure plenum but is higher than a pressure of said upper plenum; and a means for introducing coolant into said high-pressure plenum, the improvement wherein said medium-pressure plenum is disposed between said reactor core and said high-pressure plenum, and said high and medium-pressure plenums are separated by a partition plate serving as a lower supporting plate for said assemblies and said control rod guide pipes and support members thereof, said partition plate being formed therein with through-holes receiving said entrance nozzles of said fuel assemblies which extend across said medium-pressure plenum, said partition plate also being formed therein with recesses which receive said entrance nozzles of said control rod guide pipes which extend across said medium-pressure plenum, the lower ends of said fuel assemblies and said control rod guide pipes and said support members thereof extending across said medium-pressure plenum without extending across said high-pressure plenum and ending in said partition plate, means for introducing coolant from said high-pressure plenum to the lower ends of said fuel assemblies, said fuel assemblies being fed with coolant from said high-pressure plenum through said through-holes formed in said partition plate, and said control rod guide pipes being fed with coolant from said medium-pressure plenum through the at least one opening formed in the peripheral wall of said entrance nozzles of said control rod guide pipers, said flow passage in said entrance nozzle of each of said fuel assemblies having an upper section and a lower section with the upper section having a larger cross-sectional area than the lower section so that a pressure receiving area is obtained in said flow passage, at least one orifice being provided in said flow passage to enable a fuel assembly internal pressure which is effected upon said pressure receiving area, each of said through-holes in said partition plate being formed in a stepped shape to provide an annular shoulder part on which an annular bead is formed, the lower end face of said entrance nozzle abutting against said annular bead so that the pressure of said medium-pressure plenum acts upon a part of said lower end face outside of said annular bead while the pressure of said high-pressure plenum acts upon the remaining part of said end face inside of said annular bead, whereby a sufficient downward force is obtained by selecting a relationship among said fuel assembly internal pressure, the pressure of said medium-pressure plenum, said high-pressure plenum and said pressure receiving area, in order to prevent said entrance nozzle of said fuel assembly from lifting up from said annular bead.

5. A fast breeder reactor according to claim 2, wherein said high-pressure plenum and said medium-pressure plenum are located adjacent to each other with a supporting plate interposed therebetween, said supporting plate being provided with a multiplicity of recesses into which entrance nozzles that constitute the lower end portions of said fuel assemblies are inserted, and said second channel pierces through said supporting plate from the bottom surfaces of said recesses and constitutes an opening leading to said high-pressure plenum.

6. A fast breeder reactor according to claim 5, wherein an annular bead made in contact with the lower end surface of said entrance nozzle is disposed on the bottom surface of said recess concentrically with said second channel.

7. A fast breeder reactor according to claim 6, wherein a vertical section of said annular bead is a curved surface, and said curved surface is in contact with the lower end surface of said entrance nozzle.

8. A fast breeder reactor according to claim 6 or 7, wherein a transverse sectional area of said entrance nozzle radially outside of the point of contact between said entrance nozzle and said annular projection is larger than a transverse sectional area of said entrance nozzle within said point of contact.

9. A fast breeder reactor according to claim 2, wherein said high-pressure plenum and said medium-pressure plenum are communicated via a pressure-reducing means.

10. A fast breeder reactor according to claim 9, wherein said high-pressure plenum and said medium-pressure plenum are located adjacent to each other with a supporting plate interposed therebetween, said supporting plate being provided with a multiplicity of recesses in which entrance nozzles that constitute the lower end portions of said fuel assemblies are inserted, and said second channel pierces through said supporting plate from the bottom surfaces of said recesses and constitutes an opening leading to said high-pressure plenum.

11. A fast breeder reactor according to claim 10, wherein an annular bead made in contact with the lower end surface of said entrance nozzle is disposed on the bottom surface of said recess concentrically with said second channel.

12. A fast breeder reactor according to claim 11, wherein a vertical section of said annular bead is a curved surface, and said curved surface is in contact with the lower end surface of said entrance nozzle.

13. A fast breeder reactor according to claim 11 or 10, wherein a transverse sectional area of said entrance nozzle radially outside of the line of contact between said entrance nozzle and said annular projection is larger than a transverse sectional area of said entrance nozzle within said point of contact.

* * * * *